United States Patent
Sowwan et al.

(10) Patent No.: US 10,828,622 B2
(45) Date of Patent: Nov. 10, 2020

(54) ENGINEERING HIGH-PERFORMANCE PALLADIUM CORE MAGNESIUM OXIDE POROUS SHELL NANOCATALYSTS VIA HETEROGENEOUS GAS-PHASE SYNTHESIS

(71) Applicant: Okinawa Institute of Science and Technology School Corporation, Okinawa (JP)

(72) Inventors: Mukhles Ibrahim Sowwan, Okinawa (JP); Cathal Cassidy, Okinawa (JP); Vidya Dhar Singh, Okinawa (JP)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 0 days.

(21) Appl. No.: 15/736,721

(22) PCT Filed: Jun. 28, 2016

(86) PCT No.: PCT/JP2016/003093
§ 371 (c)(1),
(2) Date: Dec. 14, 2017

(87) PCT Pub. No.: WO2017/002357
PCT Pub. Date: Jan. 5, 2017

(65) Prior Publication Data
US 2018/0193820 A1    Jul. 12, 2018

Related U.S. Application Data

(60) Provisional application No. 62/186,347, filed on Jun. 29, 2015.

(51) Int. Cl.
*B01J 37/34* (2006.01)
*B01J 23/44* (2006.01)
(Continued)

(52) U.S. Cl.
CPC ............... *B01J 23/44* (2013.01); *B01J 23/02* (2013.01); *B01J 23/58* (2013.01); *B01J 33/00* (2013.01);
(Continued)

(58) Field of Classification Search
CPC ... B01J 23/44; B01J 23/02; B01J 33/00; B01J 37/0072; B01J 37/14; B01J 37/0221;
(Continued)

(56) References Cited

U.S. PATENT DOCUMENTS 5,817,410 A   10/1998 Tsujimura et al.
5,935,889 A    8/1999 Murrell et al.
(Continued)

FOREIGN PATENT DOCUMENTS

CN    101623634 A    1/2010
CN    101829789 A    9/2010
(Continued)

OTHER PUBLICATIONS

X. Chen, G. Wu, J. Chen, Xi Chen, Z. Xie and X. Wang, "Synthesis of "Clean" and Well-Dispersive Pd Nanoparticles with Excellent Electrocatalytic Property on Graphene Oxide", J. Am. Chem. Soc., 2011, 133, 3693-3695.

(Continued)

*Primary Examiner* — Haytham Soliman
(74) *Attorney, Agent, or Firm* — Westerman, Hattori, Daniels & Adrian, LLP (57) ABSTRACT

A novel catalyst includes a plurality of nanoparticles, each nanoparticle including a core made of a catalytic metal and a porous shell surrounding the core, made of metal oxide, the porous shell preserving a catalytic function of the core and reducing reduction of the core and coalescence of the nanoparticles.

2 Claims, 8 Drawing Sheets

(51) Int. Cl.
*B01J 35/00* (2006.01)
*B01J 23/58* (2006.01)
*H01M 4/92* (2006.01)
*B01J 23/02* (2006.01)
*B01J 33/00* (2006.01)
*B01J 37/00* (2006.01)
*B01J 37/02* (2006.01)
*B01J 37/14* (2006.01)
*H01M 8/1011* (2016.01)

(52) U.S. Cl.
CPC ....... *B01J 35/0006* (2013.01); *B01J 35/0013* (2013.01); *B01J 35/0086* (2013.01); *B01J 37/0072* (2013.01); *B01J 37/0221* (2013.01); *B01J 37/14* (2013.01); *B01J 37/347* (2013.01); *H01M 4/92* (2013.01); *B01J 35/002* (2013.01); *B01J 35/0033* (2013.01); *H01M 8/1011* (2013.01); *Y02E 60/50* (2013.01)

(58) Field of Classification Search
CPC ...... B01J 35/0006; B01J 23/58; B01J 37/347; B01J 35/0086; B01J 35/0013; B01J 35/002; B01J 35/0033; H01M 4/92; H01M 8/1011; Y02E 60/523
USPC .......................................................... 502/5
See application file for complete search history.

(56) References Cited

U.S. PATENT DOCUMENTS

| | | |
|---|---|---|
| 7,029,514 B1 | 4/2006 | Yang et al. |
| 7,829,140 B1 | 11/2010 | Zhong et al. |
| 7,851,405 B2 | 12/2010 | Wakamatsu et al. |
| 7,951,976 B1 | 5/2011 | Bagabas et al. |
| 8,168,561 B2 | 5/2012 | Virkar et al. |
| 8,709,969 B2 | 4/2014 | Lin et al. |
| 2008/0220296 A1 | 9/2008 | Eichhorn et al. |
| 2009/0170693 A1 | 7/2009 | Ikeda |
| 2010/0086832 A1 | 4/2010 | Lopez et al. |
| 2011/0250122 A1 | 10/2011 | Joo et al. |
| 2012/0296124 A1 | 11/2012 | Asefa et al. |
| 2014/0221199 A1 | 8/2014 | Devi et al. |
| 2014/0264191 A1 | 9/2014 | Rantala et al. |

FOREIGN PATENT DOCUMENTS

| | | |
|---|---|---|
| CN | 102266771 A | 12/2011 |
| CN | 102515984 A | 6/2012 |
| CN | 103706376 A | 4/2014 |
| JP | 2009-172601 A | 8/2009 |
| WO | 2007/063615 A1 | 6/2007 |

OTHER PUBLICATIONS

M. Perez-Lorenzo, "Palladium Nanoparticles as Efficient Catalysts for Suzuki Cross-Coupling Reactions", J. Phys. Chem. Lett. 2012, 3, 167-174.
Q. Xu, K.C. Kharas, B.J. Croley and A.K. Datye, "The Sintering of Supported Pd Automotive Catalysts", ChemCatChem 2011, 3, 1004-1014.
E. Antolini, "Palladium in fuel cell catalysis", Energy Environ. Sci., 2009, 2, 915-931.
G. Li and Z. Tang, "Noble metal nanoparticle@metal oxide core/yolk-shell nanostructures as catalysts: recent progress and perspective", Nanoscale, 2014, 6, 3995-4011.
J.A. Moulijn, A.E. van Diepen and F. Kapteijn, "Catalyst deactivation: is it predictable? What to do?", Appl Catal. A: Gen., 2001, 212, 3-16.
D. Ferrer, A. Torres-Castro, X. Gao, S. Sepulveda-Guzman, U. Ortiz-Mendez and M. Jose-Yacaman, "Three-Layer Core/Shell Structure in Au—Pd Bimetallic Nanoparticles", Nano Lett., 2007, 7, 1701-1705.
Q. Zhang, I. Lee, J. B. Joo, F. Zaera and Y. Yin, "Core-Shell Nanostructured Catalysts", Acc. Chem. Res. 2013, 46, 1816-1824.
Z. Zhang, W. Sheng and Y. Yan, "Synthesis of Monodispere Au@Co3 O4 Core-Shell Nanocrystals and Their Enhanced Catalytic Activity for Oxygen Evolution Reaction", Adv. Mater. 2014, 26, 3950-3955.
S. H. Joo, J. Y. Park, C. -K. Tsung, Y. Yamada, P. Yang and G. A. Somorjai, "Thermally stable Pt/mesoporous silica core-shell nanocatalysts for high-temperature reactions", Nature Mater. 2009, 8, 126-131.
Z. Yin, W. Zhou, Y. Gao, D. Ma, C. J. Kiely and X. Bao, "Supported Pd-Cu Bimetallic Nanoparticles That Have High Activity for the Electrochemical Oxidation of Methanol", Chem. Eur. J., 2012, 18, 4887-4893.
H. C. Zeng,"Integrated Nanocatalysts", Acc. Chem. Res, 2013, 46, 226-235.
G. Krishnan, G. Palasantzas and B. J. Kooi, "Influence of Ti on the formation and stability of gas-phase Mg nanoparticles", Appl. Phys. Lett., 2010, 97, 261912.
R. E. Palmer, S. Pratontep and H.-G. Boyen, "Nanostructured surfaces from size-selected clusters", Nature Mater., 2003, 2, 443-448.
Y.-H. Xu and J.-P. Wang, "Direct Gas-Phase Synthesis of Heterostructured Nanoparticles through Phase Separation and Surface Segregation", Adv. Mater., 2008, 20, 994-999.
K. Sumiyama, T. Hihara, D. L. Peng and R. Katoh, "Structure and magnetic properties of Co/CoO and Co/Si core-shell luster assemblies prepared via gas-phase", Sci. Tech. Adv. Mater., 2005, 6, 18-26.
L. Martinez, M. Diaz, E. Roman, M. Ruano, D. Llamosa P. and Y. Huttel, "Generation of Nanoparticles with Adjustable Size and Controlled Stoichiometry: Recent Advances", Langmuir, 2012, 28, 11241-11249.
V. Singh, C. Cassidy, P. Grammatikopoulos, F. Djurabekova, K. Nordlund and M. Sowwan, "Heterogeneous Gas-Phase Synthesis and Molecular Dynamics Modeling of Janus and Core-Satellite Si—Ag Nanoparticles", J. Phys. Chem. C, 2014, 118, 13869-13875.
C. E. Blackmore, N. V. Rees and R. E. Palmer, "Modular construction of size-selected multiplecore Pt—TiO2 nanoclusters for electrocatalysis", Phys. Chem. Chem. Phys., 2015,17, 28005-28009.
F. Ringleb, M. Sterrer and H.-J. Freund, "Preparation of Pd—MgO model catalysts by deposition of Pd fromaqueous precursor solutions onto Ag(0 0 1)-supported MgO(0 0 1) thinfilms", Appl. Catal., A, 2014, 474, 186-193.
B. J. Kooi, G. Palasantzas and J. Th. M. De Hosson, "Gas-phase synthesis of magnesium nanoparticles: A high-resolution transmission electron microscopy study",Appl. Phys. Lett, 2006, 89, 161914.
C. Cassidy, V. Singh, P. Grammatikopoulos, F. Djurabekova, K. Nordlund and M. Sowwan, "Inoculation of silicon nanoparticles with silver atoms", Sci. Rep., 2013, 3, 3083.
P. Grammatikopoulos, C. Cassidy, V. Singh and M. Sowwan, "Coalescence-induced crystallisation wave in Pd nanoparticles", Sci. Rep., 2014, 4, 5779.
A. L. Allred, "Electronegativity Values From Thermochemical Data", J. Inorg. Nucl. Chem., 1961, 17, 215-221.
K. Paredis, L. K. Ono, F. Behafarid, Z. Zhang, J. C. Yang, A. I. Frenkel and B. R. Cuenya, "Evolution of the Structure and Chemical State of Pd Nanoparticles during the in Situ Catalytic Reduction of NO with H2", J. Am. Chem. Soc., 2011, 133, 13455-13464.
"NIST XPS Database, Selected Element Search Result", NIST X-ray photoelectron spectroscopic data, NIST, USA, Web page: http://srdata.nist.gov/xps/.
H. Okamoto, "Mg—Pd (Magnesium-Palladium)", J. Phase Equil. Diff. 2010, 31, 407.
W. M. Haynes, "Melting, Boiling, Triple, and Critical Point Temperatures of the Elements", CRC Handbook of Chemistry and Physics—95th Edition, Taylor and Francis, (Boca Raton), 2014.
L. Vitos, A.V. Ruban, H.L. Skriver and J. Kollar, "The surface energy of metals", Surf. Sci., 1998, 411, 186-202.
H. Zheng, S. Wu, H. Sheng, C. Liu, Y. Liu, F. Cao, Z. Zhou, X. Zhao, D. Zhao and J. Wang, "Direct atomic-scale observation of layer-by-layer oxide growth during magnesium oxidation", Appl. Phys. Lett., 2014, 104, 141906.

(56) References Cited

OTHER PUBLICATIONS

X. Li and A. Faghri, "Review and advances of direct methanol fuel cells (DMFCs) part I: Design, fabrication, and testing with high concentration methanol solutions", J. Power Sources, 2013, 226, 223-240.

Y. Gorlin, C. J. Chung, J. D. Benck, D. Nordlund, L. Seitz, T. Weng, D. Sokaras, B. M. Clemens and T. F. Jaramillo, "Understanding Interactions between Manganese Oxide and Gold That Lead to Enhanced Activity for Electrocatalytic Water Oxidation", J. Am. Chem. Soc., 2014, 136, 4920-4926.

Z. Yin, Y. Zhang, K. Chen, L. Li, W. Li, P. Tang, H. Zaho, H. Zhao, Q. Zhu, X. Bao and D. Ma, "Monodispersed bimetallic PdAg nanoparticles with twinned structures: Formation and enhancement for the methanol oxidation", Sci. Rep., 2014, 4, 4288.

O. Pokluda, C. T. Bellehumeur and J. Viachopoulos, "Modification of Frenkel's Model for Sintering", AIChE Journal, 1997, 43, 3253-3256.

J. Wellendorff, K. T. Lundgaard, A. Mogelhoj, V. Petzold, D. D. Landis, J. K. Norskov, T. Bligaard and K. W. Jacobsen, "Density functionals for surface science: Exchange-correlation model development with Bayesian error estimation", Phys. Rev. B, 2012, 85, 235149.

A. A. Peterson, F. Abild-Pedersen, F. Studt, J. Rossmeisl and J. K. Norskov, "How copper catalyzes the electroreduction of carbon dioxide into hydrocarbon fuels", Energy Environ. Sci., 2010, 3, 1311-1315.

F. Abild-Pedersen, M. P. Andersson, "CO adsorption energies on metals with correction for high coordination adsorption sites—A density functional study", Surf. Sci. 2007, 601, 1747-1753.

F. Studt, M. Behrens and F. Abild-Pedersen, "Energetics of the Water-Gas-Shift Reaction on the Active Sites of the Industrially Used Cu/ZnO/Al2O3 Catalyst", Catal. Lett. 2014, 144, 1973-1977.

G. A. Tritsaris, J. Rossmeisl, "Methanol Oxidation on Model Elemental and Bimetallic Transition Metal Surfaces", J. Phys. Chem. C 2012, 116, 11980-11986.

D. Strmcnik, M. Uchimura, C. Wang, R. Subbaraman, N. Danilovic, D. van der Vliet, A. P. Paulikas, V. R. Stamenkovic and N. M. Markovic, "Improving the hydrogen oxidation reaction rate by promotion of hydroxyl adsorption", Nature Chem., 2013, 5, 300-306.

P. Stadelmann, "A program for the simulation of images and diffraction patterns in electron microscopy", Java Electron Microscopy Simulation (JEMS) software, Switzerland: CIME-EPFL, Ecole Polytechnique Federale de Lausanne, 2006.

O. Pokluda, C. T. Bellehumeur and J. Machopoulos, "Modification of Frenkel's Model for Sintering", AIChE Journal, 1997, 43, 3253.

Kim et al., "Design of a Highly Nanodispersed Pd—MgO/SiO2 Composite Catalyst with Multifunctional Activity for CH4 Reforming", ChemSUSChem, 2012, 5, pp. 1474-1481.

Wei et al., "Multifunctional composite core-shell nanoparticles", Nanoscale, 2011, 3, 4474-4502.

Abbet et al., "Pd1/MgO(1 0 0): a model system in nanocatalysis", Surface Science 514, 2002, pp. 249-255.

Faisal Mahmood et al., "2D Discrete Fourier Transform with Simultaneous Edge Artifact Removal for Real-Time Applications", IEEE, 2015.

Extended (Supplementary) European Search Report dated Jun. 6, 2018, issued in counterpart European application 16817467.0 (7 pages).

International Search Report (ISR) issued in PCT/JP2016/003093 dated Aug. 2016.

Written Opinion (PCT/ISA/237) issued in PCT/JP2016/003093 dated Aug. 2016.

V. Singh et al., "Heterogeneous Gas-Phase Synthesis and Molecular Dynamics Modeling of Janus and Core-Satellite Si—Ag Nanoparticles", The Journal of Physical Chemistry C, Jun. 26, 2014, vol. 118, No. 25, pp. 13869-13875, ISSN1932-7447.

V. Singh et al., "Engineering high-performance Pd core-MgO porous shell nanocatalysts via heterogeneous gas-phase synthesis", Nanoscale, Aug. 28, 2015, vol. 7, No. 32, pp. 13387-13392, ISSN2040-3364.

Office Action dated Sep. 4, 2019, issued in Chinese Patent Application No. 201680029830.4, with English translation.

Office Action dated Mar. 25, 2020, issued in counterpart CN Application No. 201680029830.4, with English Translation. (9 pages).

Office Action dated Jun. 2, 2020, issued in counterpart JP application No. 2017-564753, with English translation. (5 pages).

ENGINEERING HIGH-PERFORMANCE PALLADIUM CORE MAGNESIUM OXIDE POROUS SHELL NANOCATALYSTS VIA HETEROGENEOUS GAS-PHASE SYNTHESIS

The present invention relates to the design and synthesis of high performance catalytic nanoparticles with robust geometry via magnetron-sputter inert-gas condensation. This application hereby incorporates by reference U.S. Provisional Application No. 62/186,347, filed Jun. 29, 2015, in its entirety.

TECHNICAL FIELD

Background Art

Palladium (Pd) is a well-established catalyst material (NPL Nos. 1 and 2), but suffers from extremely high cost, and lifetime degradation owing to sintering and associated irreversible reduction in surface area (NPL Nos. 1 and 2). To address these issues, a metal oxide shell has been proposed as a powerful tool for minimizing deactivation of the catalyst by metal sintering (NPL Nos. 5 and 6). In order to achieve such improved performance via metal oxide encapsulation, however, a key requirement is to find out suitable microstructures by appropriate choices of material set and synthesis method so that the high catalytic function of the core catalyst can be maintained in a controlled and efficient manner. But such microstructures and associated synthesis methods have not been established yet.

For synthesis of core-shell nanoparticles, chemical methods have been widely reported (NPL Nos. 5 and 7-12). Although much less common, heterogeneous gas-phase synthesis has also been reported (NPL Nos. 13, 14, and 15). For example, Xu et al (NPL No. 15) worked on the gas-phase synthesis of Co—Au and Fe—Ag core-shell nanoparticles from composite sputtering targets, with the formation mechanism being dominated by phase segregation of these immiscible materials. Independent sputtering from separate targets has also been reported for Co/Si (NPL No. 16) and Ag/Au/Pd (NPL No. 17). Similarly, the binary Si—Ag core-satellite and Janus nanostructures were also prepared according to our recently published procedure (NPL No. 18). Using similar synthesis technique, Blackmore and co-workers recently reported on size-selected multiple-core Pt—$TiO_2$ nanoclusters, sputtered from single alloyed targets and also studied their catalytic activity (NPL No. 19). Based on the emerging application of gas-phase synthesis to prepare binary or core-shell nanoparticles, it is evident that such a technique allows a high degree of control over critical parameters such as particle size, composition, density and electrode coverage, and it avoids the inherent products introduced by chemical synthesis from precursors and surfactants.

For catalysis applications, magnesium oxide (MgO) has frequently been studied as a support for Pd nanocatalysts (NPL No. 20). For heterogeneous gas-phase nucleation of Mg and Pd, previous results on similar systems (Mg—Ti) (NPL Nos. 13 and 21) indicate that a Pd core surrounded by an MgO shell could be formed. Furthermore, when synthesized alone from the gas-phase, MgO nanoparticles exhibit a highly porous structure (NPL No. 21), a necessary requirement in any potential catalyst encapsulant. The present inventors have noted that these results suggest that, via heterogeneous gas-phase synthesis, structures suitable for catalysts made of a metal catalyst (Pd) inside a porous metal oxide shell (MgO) might be achieved in a controllable, simple process.

CITATION LIST

Non Patent Literature

NPL 1: X. Chen, G. Wu, J. Chen, Xi Chen, Z. Xie and X. Wang, J. Am. Chem. Soc., 2011, 133, 3693-3695.
NPL 2: M. Perez-Lorenzo, J. Phys. Chem. Lett. 2012, 3, 167-174.
NPL 3: Q. Xu, K. C. Kharas, B. J. Croley and A. K. Datye, Chem Cat Chem 2011, 3, 1004-1014.
NPL 4: E. Antolini, Energy Environ. Sci., 2009, 2, 915-931.
NPL 5: G. Li and Z. Tang, Nanoscale, 2014, 6, 3995-4011.
NPL 6: J. A. Moulijn, A. E. van Diepen and F. Kapteijn, Appl Catal. A: Gen., 2001, 212, 3-16.
NPL 7: D. Ferrer, A. Tones-Castro, X. Gao, S. Sepulveda-Guzman, U. Ortiz-Mendez and M. Jose-Yacaman, Nano Lett., 2007, 7, 1701-1705.
NPL 8: Q. Zhang, I. Lee, J. B. Joo, F. Zaera and Y. Yin, Acc. Chem. Res. 2013, 46, 1816-1824.
NPL 9: Z. Zhang, W. Sheng and Y. Yan, Adv. Mater. 2014, 26, 3950-3955.
NPL 10: S. H. Joo, J. Y. Park, C.-K. Tsung, Y. Yamada, P. Yang and G. A. Somorjai, Nature Mater. 2009, 8, 126-131.
NPL 11: Z. Yin, W. Zhou, Y. Gao, D. Ma, C. J. Kiely and X. Bao, Chem. Eur. J., 2012, 18, 4887-4893.
NPL 12: H. C. Zeng, Acc. Chem. Res, 2013, 46, 226-235.
NPL 13: G. Krishnan, G. Palasantzas and B. J. Kooi, Appl. Phys. Lett., 2010, 97, 261912.
NPL 14: R. E. Palmer, S. Pratontep and H.-G. Boyen, Nature Mater., 2003, 2, 443-448.
NPL 15: Y.-H. Xu and J.-P. Wang, Adv. Mater., 2008, 20, 994-999.
NPL 16: K. Sumiyama, T. Hihara, D. L. Peng and R. Katoh, Sci. Tech. Adv. Mater., 2005, 6, 18-26.
NPL 17: L. Martinez, M. Diaz, E. Roman, M. Ruano, D. Llamosa P. and Y. Huttel, Langmuir, 2012, 28, 11241-11249.
NPL 18: V. Singh, C. Cassidy, P. Grammatikopoulos, F. Djurabekova, K. Nordlund and M. Sowwan, J. Phys. Chem. C, 2014, 118, 13869-13875.
NPL 19: C. E. Blackmore, N. V. Rees and R. E. Palmer, Phys. Chem. Chem. Phys., 2015, 17, 28005-28009.
NPL 20: F. Ringleb, M. Sterner and H.-J. Freund, Appl. Catal., A, 2014, 474, 186-193.
NPL 21: B. J. Kooi, G. Palasantzas and J. Th. M. De Hosson, Appl. Phys. Lett, 2006, 89, 161914.
[NPL 22] C. Cassidy, V. Singh, P. Grammatikopoulos, F. Djurabekova, K. Nordlund and M. Sowwan, Sci. Rep., 2013, 3, 3083.
NPL 23: P. Grammatikopoulos, C. Cassidy, V. Singh and M. Sowwan, Sci. Rep., 2014, 4, 5779.
NPL 24: A. L. Allred, J. Inorg. Nucl. Chem., 1961, 17, 215-221.
NPL 25: K. Paredis, L. K. Ono, F. Behafarid, Z. Zhang, J. C. Yang, A. I. Frenkel and B. R. Cuenya, J. Am. Chem. Soc., 2011, 133, 13455-13464.
NPL 26: NIST X-ray photoelectron spectroscopic data, NIST, USA, Web page: http://srdata.nist.gov/xps/.
NPL 27: H. Okamoto, J. Phase Equil. Diff. 2010, 31, 407.
NPL 28: W. M. Haynes, CRC Handbook of Chemistry and Physics—95th Edition, Taylor and Francis, (Boca Raton), 2014.

NPL 29: L. Vitos, A. V. Ruban, H. L. Shiver and J. Kollar, Surf. Sci., 1998, 411, 186-202.

NPL 30: H. Zheng, S. Wu, H. Sheng, C. Liu, Y. Liu, F. Cao, Z. Zhou, X. Zhao, D. Zhao and J. Wang, Appl. Phys. Lett., 2014, 104, 141906.

NPL 31: X. Li and A. Faghri, J. Power Sources, 2013, 226, 223-240.

NPL 32: Y. Gorlin, C.-J. Chung, J. D. Benck, D. Nordlund, L. Seitz, T. Weng, D. Sokaras, B. M. Clemens and T. F. Jaramillo, J. Am. Chem. Soc., 2014, 136, 4920-4926.

NPL 33: Z. Yin, Y. Zhang, K. Chen, L. Li, W. Li, P. Tang, H. Zaho, H. Zhao, Q. Zhu, X. Bao and D. Ma, Sci. Rep., 2014, 4, 4288.

NPL 34: O. Pokluda, C. T. Bellehumeur and J. Machopoulos, AIChE Journal, 1997, 43, 3253-3256.

NPL 35: J. Wellendorff, K. T. Lundgaard, A. Mogelhoj, V. Petzold, D. D. Landis, J. K. Norskov, T. Bligaard and K. W. Jacobsen, Phys. Rev. B, 2012, 85, 235149.

NPL 36: A. A. Peterson, F. Abild-Pedersen, F. Studt, J. Rossmeisl and J. K. Norskov, Energy Environ. Sci., 2010, 3, 1311-1315.

NPL 37: F. Abild-Pedersen, M. P. Andersson, Surf. Sci. 2007, 601, 1747-1753.

NPL 38: F. Studt, M. Behrens and F. Abild-Pedersen, Catal. Lett. 2014, 144, 1973-1977.

NPL 39: G. A. Tritsaris, J. Rossmeisl, J. Phys. Chem. C 2012, 116, 11980-11986.

NPL 40: D. Strmcnik, M. Uchimura, C. Wang, R. Subbaraman, N. Danilovic, D. van der Vliet, A. P. Paulikas, V. R. Stamenkovic and N. M. Markovic, Nature Chem., 2013, 5, 300-306.

NPL 41: P. Stadelmann, "Java Electron Microscopy Simulation (JEMS) software." Switzerland: CIME-EPFL, Ecole Polytechnique Federale de Lausanne, 2006.

NPL 42: B. J. Kooi, G. Palasantzas and J. Th. M. De Hosson, Appl. Phys. Lett., 2006, 89, 161914.

NPL 43: P. Grammatikopoulos, C. Cassidy, V. Singh and M. Sowwan, Sci. Rep., 2014, 4, 5779.

NPL 44: O. Pokluda, C. T. Bellehumeur and J. Machopoulos, AIChE Journal, 1997, 43, 3253.

SUMMARY OF INVENTION

Technical Problem

Despite numerous research and development efforts, as described above, to date, high performance catalytic nanoparticles with robust geometry, in particular, Pd core MgO-porous shell nanocatalysts, have not been successfully manufactured in a controlled and reliable manner.

Accordingly, the present invention is directed to designs and synthesis of high performance catalytic nanoparticles, in particular, to designs and synthesis of Pd core-MgO porous shell nanocatalysts with robust geometry via magnetron-sputter inert-gas condensation.

An object of the present invention is to provide designs and synthesis of high performance catalytic nanoparticles.

Another object of the present invention is to provide designs and synthesis of Pd core-MgO porous shell nanocatalysts with robust geometry via magnetron-sputter inert-gas condensation.

Solution to Problem

To achieve these and other advantages and in accordance with the purpose of the present invention, as embodied and broadly described, in one aspect, the present invention provides a catalyst, comprising a plurality of nanoparticles, each nanoparticle comprising a core made of a catalytic metal; and a porous shell surrounding the core, made of metal oxide, the porous shell preserving a catalytic function of the core and reducing reduction of the core and coalescence of the nanoparticles.

In the catalyst, the catalytic metal may be Pd, and the porous shell may be made of MgO.

In another aspect, the present invention provides a catalyst, comprising nanoparticles, each nanoparticle consisting of: a core made of Pd and a porous shell made of MgO, surrounding the core, a porosity of the porous shell being such that a catalytic function of Pd is preserved, and reduction of the core and coalescence of the nanoparticles are reduced.

In another aspect, the present invention provides a method for manufacturing Pd core-MgO shell nanoparticles, the method comprising: forming a super-saturated vapor of Mg and a super-saturated vapor of Pd by sputtering using an Mg target and a Pd target in a vacuumed aggregation chamber; transporting the super-saturated vapors of Pd and Mg to a vacuumed deposition chamber so that Pd nucleates and clusters first, followed by Mg nucleation and growth on the clustered Pd, surrounding the Pd cluster; and thereafter, exposing resulting the Pd cluster surrounded by the grown Mg to oxygen to oxidize said surrounding Mg, thereby forming nanoparticles on a substrate in the deposition chamber, each of the nanoparticles consisting of one or more of a core made of Pd and a porous shell made of MgO surrounding said one or more of the core.

The method may further include changing a sputtering power ratio for Pd and Mg so as to create the nanoparticles of different sizes with different numbers of the core therein.

Advantageous Effects of Invention

According to one or more aspects of the present invention, effective and sintering-resistant novel catalytic materials are provided for a wide range of chemical and engineering applications. Moreover, controllable and reliable manufacturing method therefor is provided.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory, and are intended to provide further explanation of the invention as claimed.

BRIEF DESCRIPTION OF DRAWINGS

GIXRD pattern of the Pd core-MgO shell nanoparticles on a silicon substrate at a fixed grazing angle of 0.2 degrees.

FIG. 6 illustrates direct engineering of the nanoparticle structure by varying the relative number densities of each vapor species in the aggregation zone. FIG. 6, (a) to (d) show low magnification STEM images and (e) to (f) show size distributions for the Pd core-MgO shell nanoparticles for various Pd/Mg sputtering power ratios; 0.66 for (a) and (e), 0.33 for (b) and (f), 0.14 for (c) and (g), and 0.11 for (d) and (h), respectively.

FIG. 8 shows cyclic voltammetry (CV) measurements.

DESCRIPTION OF EMBODIMENTS

The present inventors have conducted a series of new experiments on heterogeneous gas-phase condensation of Pd and Mg to form Pd core-MgO porous shell nanoparticles and examined their catalytic performance towards methanol electro-oxidation.

Sputtering of Pd and Mg from two independent neighboring targets enabled heterogeneous condensation and growth of nanoparticles with controlled Pd core-MgO porous shell structure. It was found that the thickness of the shell and the number of cores within each nanoparticle can be tailored by adjusting the respective sputtering powers. The nanoparticles were directly deposited on glassy carbon (GC) electrodes (as a substrate on which the nanoparticles are to be formed), and their catalytic activity towards methanol oxidation was examined by cyclic voltammetry. The measurements indicated that the catalytic activity of nanoparticles according to the present invention is superior to conventional bare Pd nanoparticles. It was found that the improved catalytic performance is attributed primarily to inhibition of Pd cores sintering during the catalytic processes by the metal-oxide shell.

Figure 1:
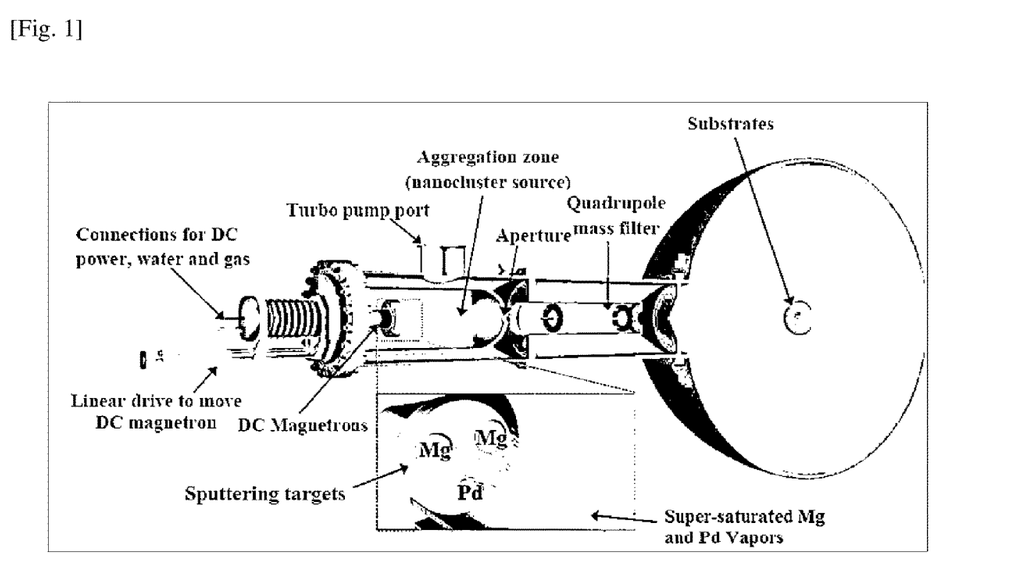
FIG. 1 shows a schematic of a magnetron sputter inert gas condensation setup used for the synthesis of Pd core-MgO shell nanocatalysts.

All samples were produced using a multi-target gas-aggregated sputtering chamber shown in FIG. 1 (NPL Nos. 18 and 22). FIG. 1 shows a schematic of a magnetron sputter inert gas condensation setup used for the synthesis of Pd core-MgO shell nanocatalysts.

<Synthesis Materials and Method>

Magnesium magnetron-sputtering target (Mg, purity >99.95%) and Palladium magnetron sputtering target (Pd, purity >99.95%) with dimensions of 25 mm diameter×3 mm thick were purchased from Kurt J. Lesker (PA, USA) for used in sample productions. High purity methanol, acetone, isopropanol, were purchased from Sigma-Aldrich Japan. As substrates for AFM and XPS measurements, undoped Si dice with (100) orientation and 5 mm×5 mm in size were purchased from MTI Corporation (CA, USA). Cu frames with electron transparent carbon coated grids (400 mesh) and silicon nitride membranes were purchased from Ted Pella Inc. (CA, USA), as substrates for TEM/STEM-HAADF analysis.

The Pd, MgO, and Pd core-MgO shell nanoparticles were synthesized using a magnetron-sputtering with inert-gas aggregation system (Mantis Deposition Ltd, UK), as illustrated in FIG. 1. The deposition system includes a nanocluster sputtering source, a quadrupole mass filter (QMF) and a deposition chamber. Mg and Pd sputtering targets were located side-by-side on an integrated magnetron sputtering head, as shown in the inset in FIG. 1. The desired physical and chemical properties of multicomponent hybrid nanoparticles can be tailored by controlling the size of the nanoparticles, as well as the volume fraction of each component. In the configuration according to the present invention, this was achieved by tuning the magnetron power applied on each target independently while co-sputtering. Preliminary studies were conducted to identify suitable deposition parameters for both materials, via in situ QMF feedback and deposited cluster characterization. Ar and He flow rates were 90 and 10 sccm (respectively), resulting in an aggregation zone pressure reading of $3.5\times10^{-1}$ mbar. The aggregation zone length was set to 100 mm. The base pressure was $1.0\times10^{-8}$ mbar in the main deposition chamber. For the present disclosure, we have used three magnetrons with one palladium and two magnesium targets. A series of samples was produced, keeping the same flow of argon and helium to the magnetrons. The only parameter that was adjusted was the DC power applied to each magnetron. In the sample deposition series, the nanoparticle composition ranged from pure Mg to pure Pd, passing through four intermediate chemical compositions. Tuning of the core-shell nanoparticle size was achieved by varying the sputtering power supplied to the Pd target (7.5 W to 30 W) and Mg target (45 W to 65 W). For comparison, Mg and Pd are deposited under the same conditions, separately onto the same substrates, sequentially rather than simultaneously. The nanoparticles were deposited on either (holey) carbon coated Cu/Au grids or on 8 nm thick silicon nitride membranes. In order to obtain suitable substrate coverage, the deposition time ranged from a few minutes (for preliminary TEM structure characterizations on mono-disperse nanoparticles) up to 15 minutes (for electrochemistry studies).

<Evaluation and Characterization>

A Bruker Multimode 8 atomic force microscope (AFM) was used to analyze the topography of the samples. The AFM System, equipped with the NanoScope® V controller, was utilized in tapping mode using a triangular silicon-nitride AFM tip (radius <10 nm, force constant of 0.35 N/m, 65 kHz of resonant frequency).

HR-TEM studies were carried out using an FEI Titan microscope, operated at both 80 kV and 300 kV, equipped with a spherical aberration corrector for the image. In image-corrected TEM mode, the spherical and chromatic aberrations were <5 μm and 1.4 mm, respectively, with an optimum resolution of better than 0.09 nm. TEM image simulations were performed using the JEMS software package (NPL No. 41).

HR-STEM studies were performed on a FEI Titan3 G2 microscope with a $C_s$-corrector for the probe. STEM-HAADF and BF images were recorded at 300 kV with a convergence angle of 19.9 mrad and a camera length of 91 mm. EDX measurements were done with a Super-X detector system from Bruker with a step size of 0.06 nm and a pixel time of 0.08 s (number of cycles: 10) for the line scan.

XPS measurements were performed in a Kratos AXIS Ultra DLD Photoelectron spectrometer, with a Mg $K_\alpha$ anode (1253.6 eV), and a base pressure of $2\times10^{-9}$ mbar. The Mg 2p, Pd 3d and O 1s core level narrow spectra were recorded using pass energy of 20 eV for high resolution.

Grazing incidence x-ray diffraction (GIXRD) measurements were performed in a Bruker D8 Discover XRD (thin film system), using Cu $K_\alpha$ radiation (40 kV/40 mA) at a fixed grazing incidence angle of 0.2 degrees.

<Electrochemical Measurements>
<Preparation of Nanoparticle Catalysts on Glassy Carbon Electrode Substrates>

Nanoparticles were directly deposited onto the electrode surface inside the Mantis UHV nanoparticle sputtering system described above. Nanoparticle dimensions and surface coverage were evaluated using TEM images, and associated mass was calculated assuming bulk density values. The estimated loading of catalyst to be 0.085 micrograms and 0.034 micrograms for Pd and Pd core-MgO shell samples, respectively.

<Electrochemical Characterization>

The electrocatalysis measurements were performed at room temperature with an electrochemical workstation 440B (CH Instruments Co., US). A conventional three-electrode system was used, which consists of a nanoparticles-modified glassy carbon (GC) electrode as the working electrode, a Pt wire as the counter-electrode, and an Ag/AgCl (3 M KCl) electrode as the reference electrode. All working solutions (1 M KOH) were purged with nitrogen for 30 min before measurements.

<Results>

Figure 2:
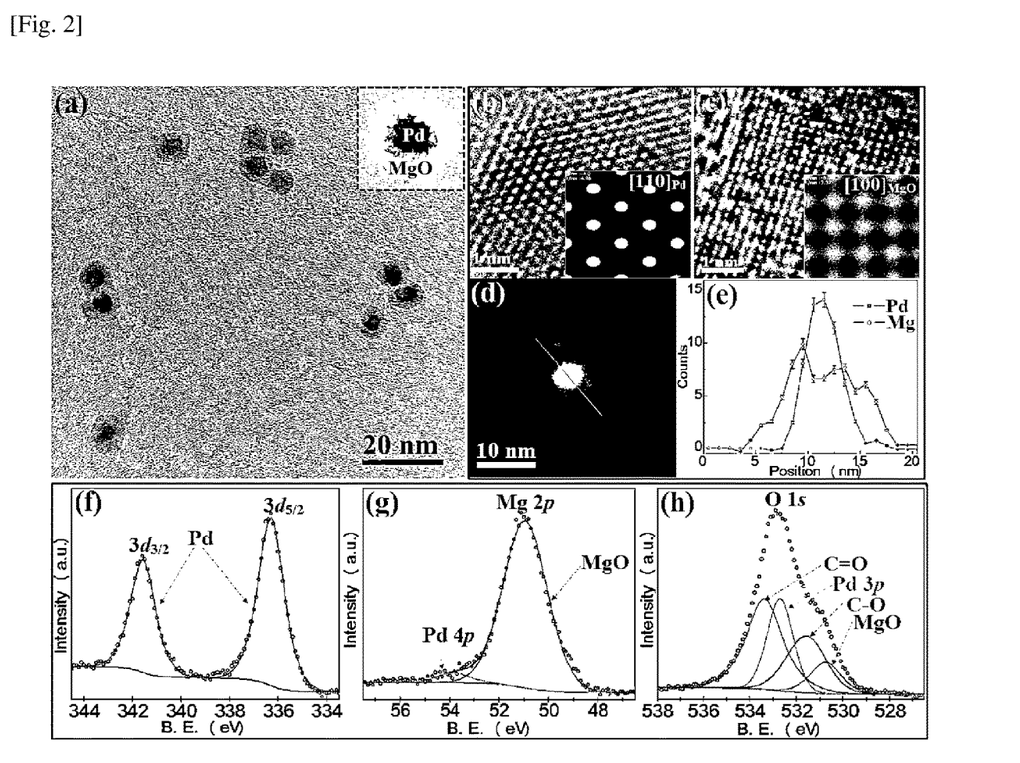
FIG. 2 shows evaluated structures of manufactured Pd core-MgO shell nanoparticles according to an embodiment of the present invention. (a) is a low magnification TEM overview of the Pd core-MgO shell nanoparticles exhibiting core-shell morphology. (b) is an HRTEM image of core (Pd) region and (c) is an HRTEM image of the shell (MgO) region. The Insets in (b) and (c) are respectively simulated images of the corresponding HRTEM images. (d) is an HAADF-STEM image of core-shell the Pd core-MgO shell nanoparticles. (e) is a distribution of Mg and Pd components in the Pd core-MgO shell nanoparticles obtained by the line-scan analysis using STEM-EDS (along the line in (d)). (f) to (h) are high resolution core-level XPS spectra for Pd 3d, Mg 2p, and O 1s, respectively, from the Pd core-MgO shell nanoparticles.

The structure of a synthesized sample according to an embodiment of the present invention, i.e., Pd core-MgO shell nanocatalysts, is shown in FIG. 2. FIG. 2 shows evaluated structures of manufactured Pd core-MgO shell nanoparticles according to an embodiment of the present invention. (a) is a low magnification TEM overview of the Pd core-MgO shell nanoparticles exhibiting core-shell morphology. (b) is an HRTEM image of core (Pd) region and (c) is an HRTEM image of the shell (MgO) region. The Insets in (b) and (c) are respectively simulated images of the corresponding HRTEM images. (d) is an HAADF-STEM image of core-shell the Pd core-MgO shell nanoparticles. (e) is a distribution of Mg and Pd components in the Pd core-MgO shell nanoparticles obtained by the line-scan analysis using STEM-EDS (along the line in (d)). (f) to (h) are high resolution core-level XPS spectra for Pd 3d, Mg 2p, and O 1s, respectively, from the Pd core-MgO shell nanoparticles.

The core-shell structure and uniformity are found by transmission electron microscopy (TEM), as shown in (a) in FIG. 2, with total diameters of approximately 10 nm. The cores are single crystalline Pd and the shells are polycrystalline MgO, with lattice spacings matching the literature values (NPL Nos. 21 and 23), as shown in (b) and (c), respectively, of FIG. 2. The insets of these figures present their corresponding TEM image simulations. (d) and (e) in FIG. 2 show a HAADF-STEM (z-contrast) micrograph, and extracted EDX line profile, respectively, confirming the core-shell structure.

Figure 3:
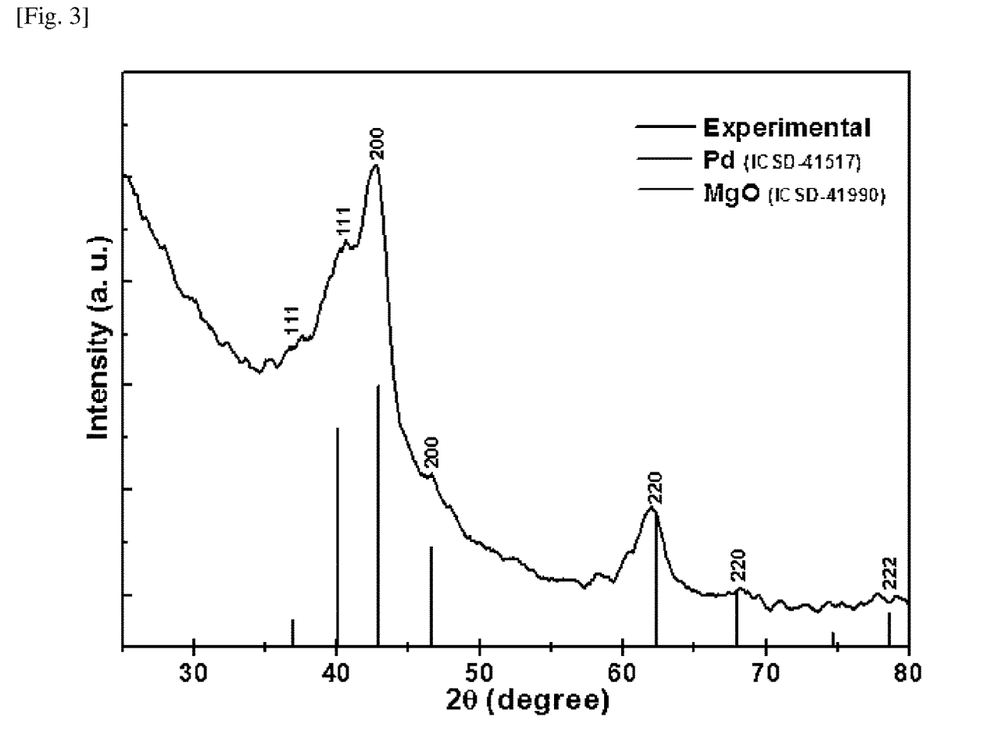
Figure 4:
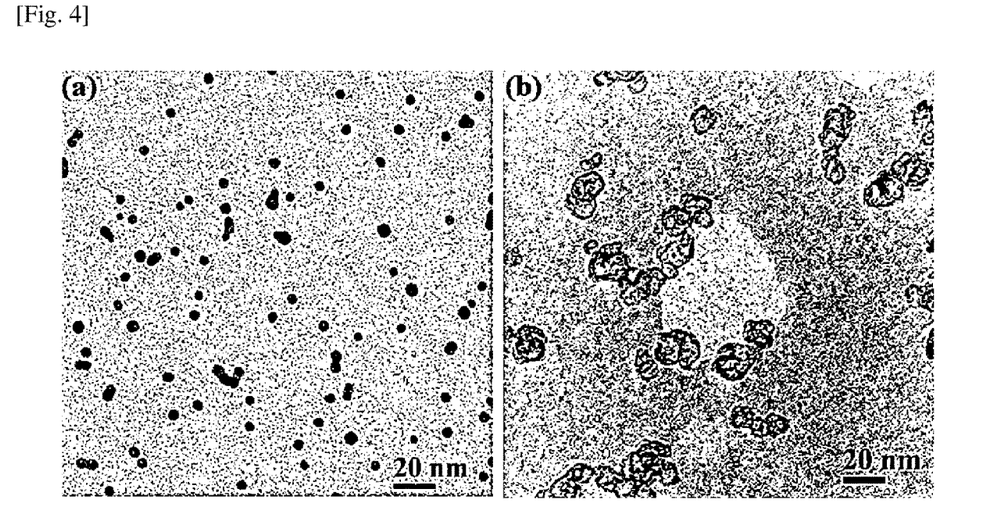
FIG. 4 shows TEM images of (a) Pd and (b) MgO nanoparticles, deposited separately but otherwise with identical deposition parameters for the Pd core-MgO shell nanoparticles. The image clearly shows the porosity of the oxidized Mg structures, as reported previously in NPL No. 42.

FIG. 3 shows GIXRD pattern of the Pd core-MgO shell nanoparticles according to an embodiment of the present invention on a silicon substrate at a fixed grazing angle of 0.2 degrees. The X-ray diffraction (FIG. 3) clearly shows distinct peaks for Pd and MgO (and not any alloy phases). FIG. 4 shows TEM images of (a) Pd and (b) MgO nanoparticles, deposited separately but otherwise with identical deposition parameters. The image clearly shows the porosity of the oxidized Mg structures, as reported previously in NPL No. 42.

Figure 5:
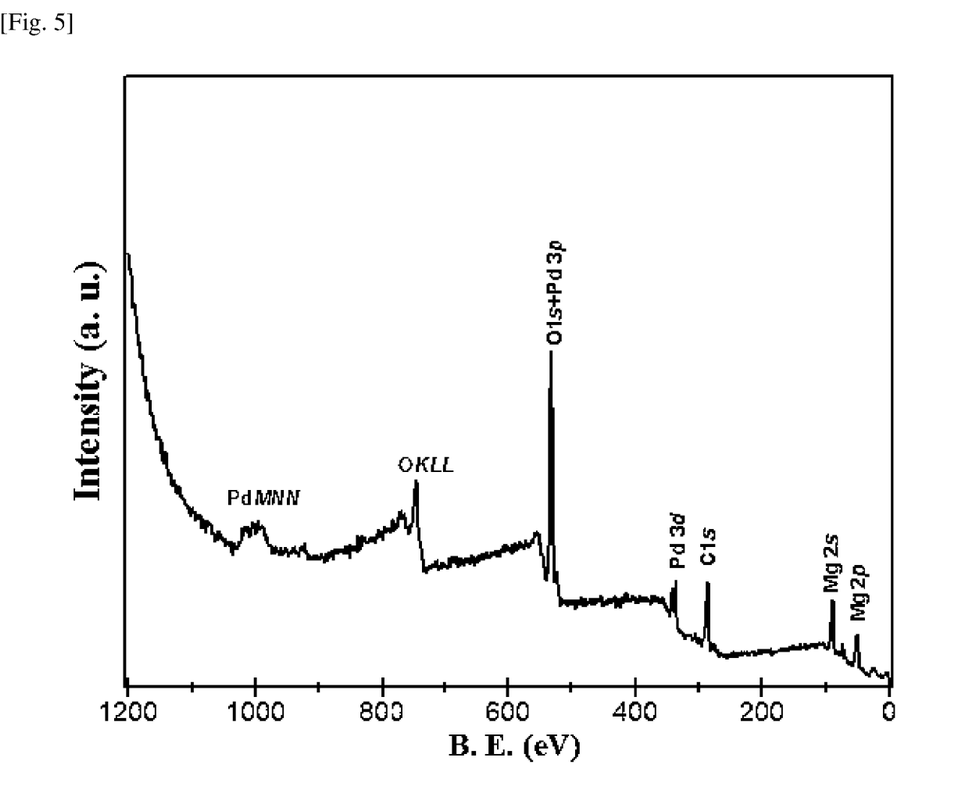
FIG. 5 is an XPS survey spectrum of the Pd core-MgO shell nanoparticles.

While TEM provides high spatial resolution on a tiny proportion of the specimen, X-ray photoelectron spectroscopy (XPS), on the other hand, allows us to gain statistical information from a wide area of the sample. FIG. 5 is an XPS survey spectrum of the the Pd core-MgO shell nanoparticles. This wide scan spectrum of FIG. 5 reveals strong characteristic signals of Pd, Mg, and O (as well as C from the substrate). Turning back to FIG. 2, (f) in FIG. 2 shows the XPS spectrum for the Pd 3d core level of the Pd core-MgO shell nanoparticles. The Pd $3d_{5/2}$ peak shifts towards higher binding energy (BE), with ΔE of about 0.8 eV, compared to that of Pd nanoparticles (335.5 eV). This shift in BE is due to the small amount of electron transfer from MgO to Pd, consistent with the difference in the electronegativities of Pd and Mg (Pd=2.20 and Mg=1.31) (NPL No. 24). The Pd $3d_{5/2}$ peak associated with PdO (336.7 eV) has not been observed in any of the acquired spectra (NPL No. 25). Mg 2p core level spectra ((g) in FIG. 2) with broad Mg 2p peaks revealed the presence of a certain amount of Mg—O bonds in the sample. The BE of the Mg 2p core level that corresponds to MgO nanoparticles (51.0 eV) is located at higher BE than for bulk metallic Mg (49.7 eV) (NPL No. 26). In addition, the O 1s spectrum is characterized by three bands ((g) in FIG. 2): two at 532.3 and 531.6 eV, which are due to the absorption of oxygen molecules on the carbon surface, and one at 530.8 eV, which corresponds to the MgO.

Given the difference in condensation and solidification temperatures (NPL Nos. 27 and 28), Pd nucleates much more quickly than Mg in a heterogeneous vapor cloud. In this situation, the pre-formed Pd clusters act as nucleation seeds for the Mg vapor, allowing rapid growth of a Mg shell on the Pd cluster, as published previously for Mg/Ti (NPL No. 13). Furthermore, the surface energy of Mg (0.8 J/m$^2$) is significantly lower than that of Pd (2.0 J/m$^2$) (NPL No. 29), making it energetically favorable for Mg atoms to migrate or stay on the surface of the pre-formed Pd cluster, forming a shell. Finally, upon exposure to oxygen, the shell oxidizes to form MgO (NPL Nos. 21 and 30).

Figure 6:
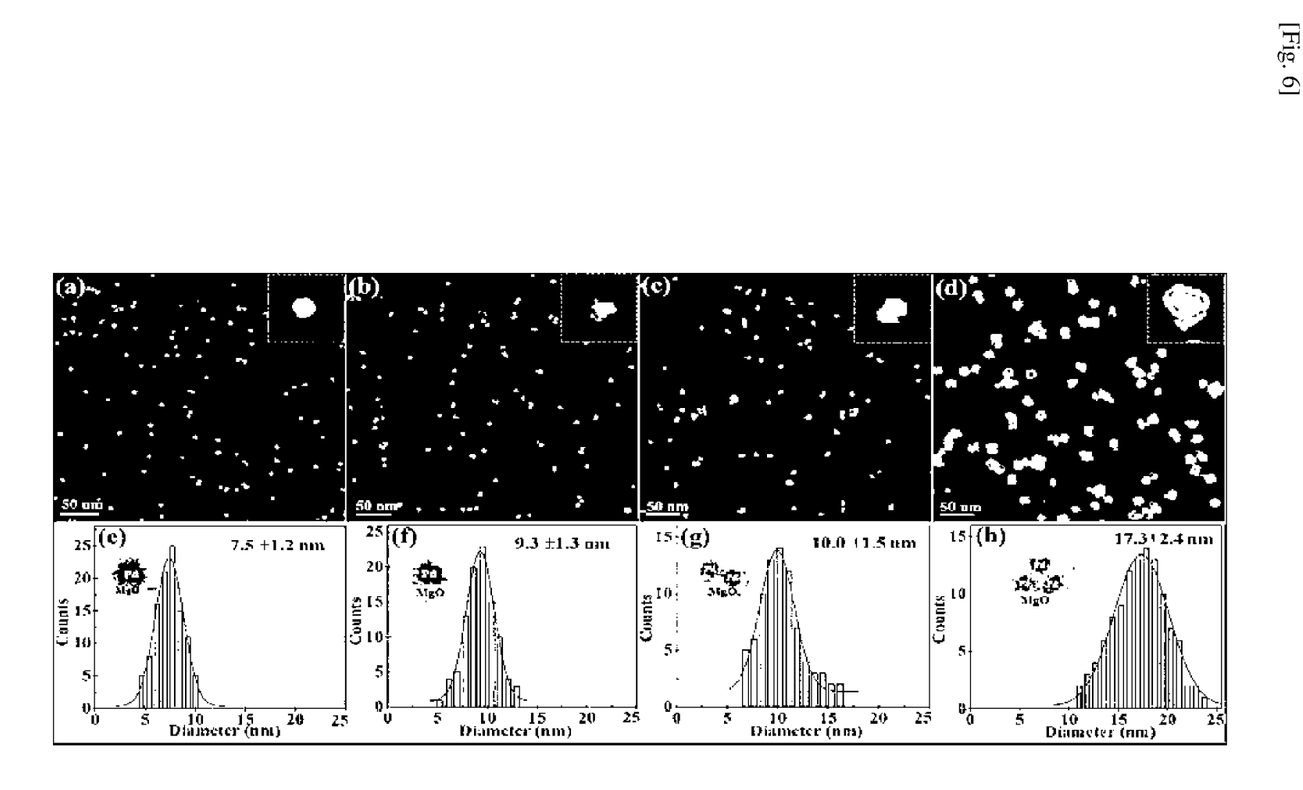

Major advantages of gas-phase synthesis according to the present invention include the ease with which the deposition conditions and the controllability of resultant structures (NPL No. 18). An example showing the extent to which the nanoparticle size and structure can be engineered is demonstrated in the STEM micrographs in FIG. 6, (a) to (d). FIG. 6 illustrates direct engineering of the nanoparticle structure by varying the relative number densities of each vapor species in the aggregation zone. In FIG. 6, (a) to (d) show low magnification STEM images and (e) to (f) show size distributions for the Pd core-MgO shell nanoparticles for various Pd/Mg sputtering power ratios; 0.66 for (a) and (e), 0.33 for (b) and (f), 0.14 for (c) and (g), and 0.11 for (d) and (h), respectively. This was achieved simply by varying the quantity of active sputtering targets and the applied sputtering power, to the individual Mg and Pd magnetron heads (see FIG. 1). The results show four cases, with varying size distributions, as shown in (e) to (h) of FIG. 6. Thus, it was found that the size and internal morphology can be directly manipulated and controlled by varying the sputtering powers.

Figure 7:
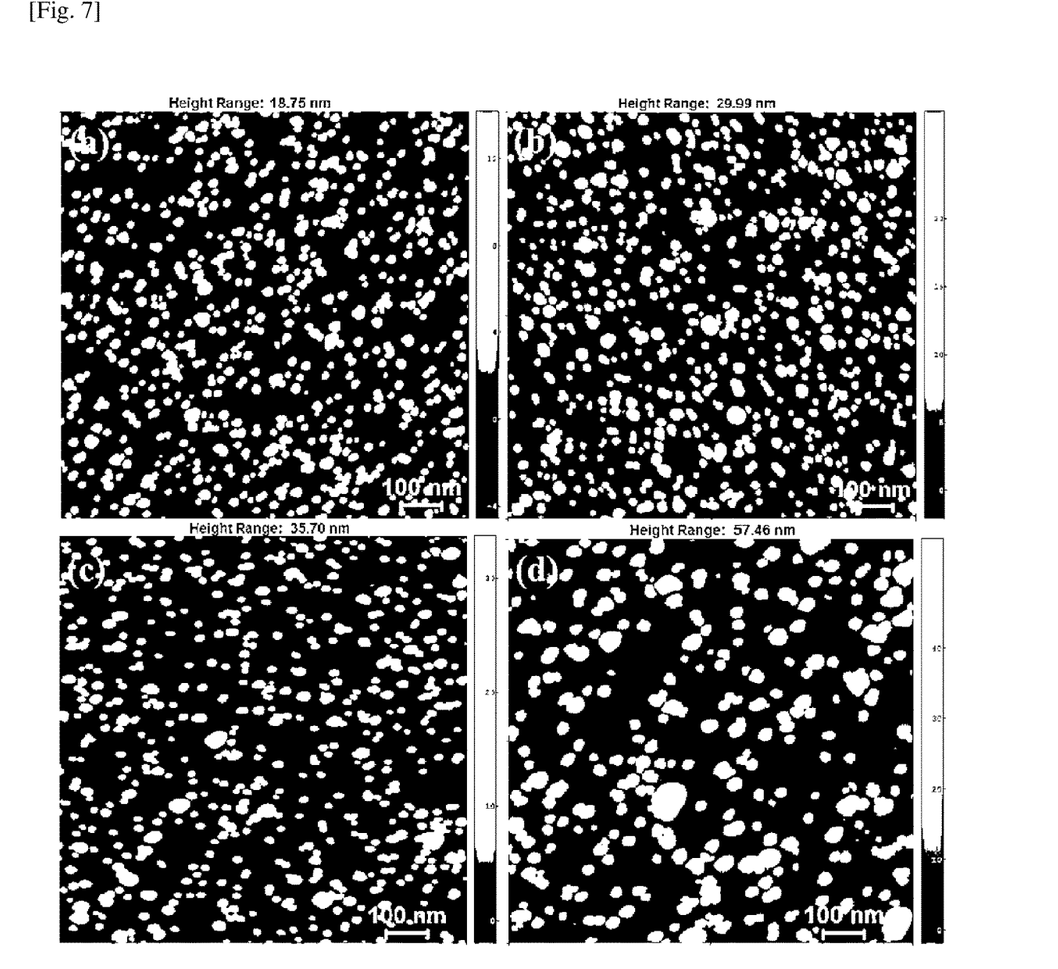
FIG. 7 shows AFM images of the Pd core-MgO shell nanoparticles for different Pd/Mg sputtering power ratios; (a) 0.66, (b) 0.33, (c) 0.14, and (d) 0.11.

For sputtering power ratios of 0.66, 0.33, 0.14 and 0.11, the average diameters were determined to be 7.5+−1.2 nm, 9.3+−1.3 nm, 10.0+−1.5 nm, and 17.3+−2.5 nm, respectively. FIG. 7 shows AFM images of the Pd core-MgO shell nanoparticles for different Pd/Mg sputtering power ratios; (a) 0.66, (b) 0.33, (c) 0.14, and (d) 0.11, which highlight the control of the gas-phase process.

After synthesis, the catalytic properties of these the Pd core-MgO shell structures were evaluated for electrochemical oxidation of methanol. This reaction is central to the operation of direct methanol fuel cells. However, presently, utilization of this reaction is limited by its low efficiency (NPL No. 31).

Figure 8:
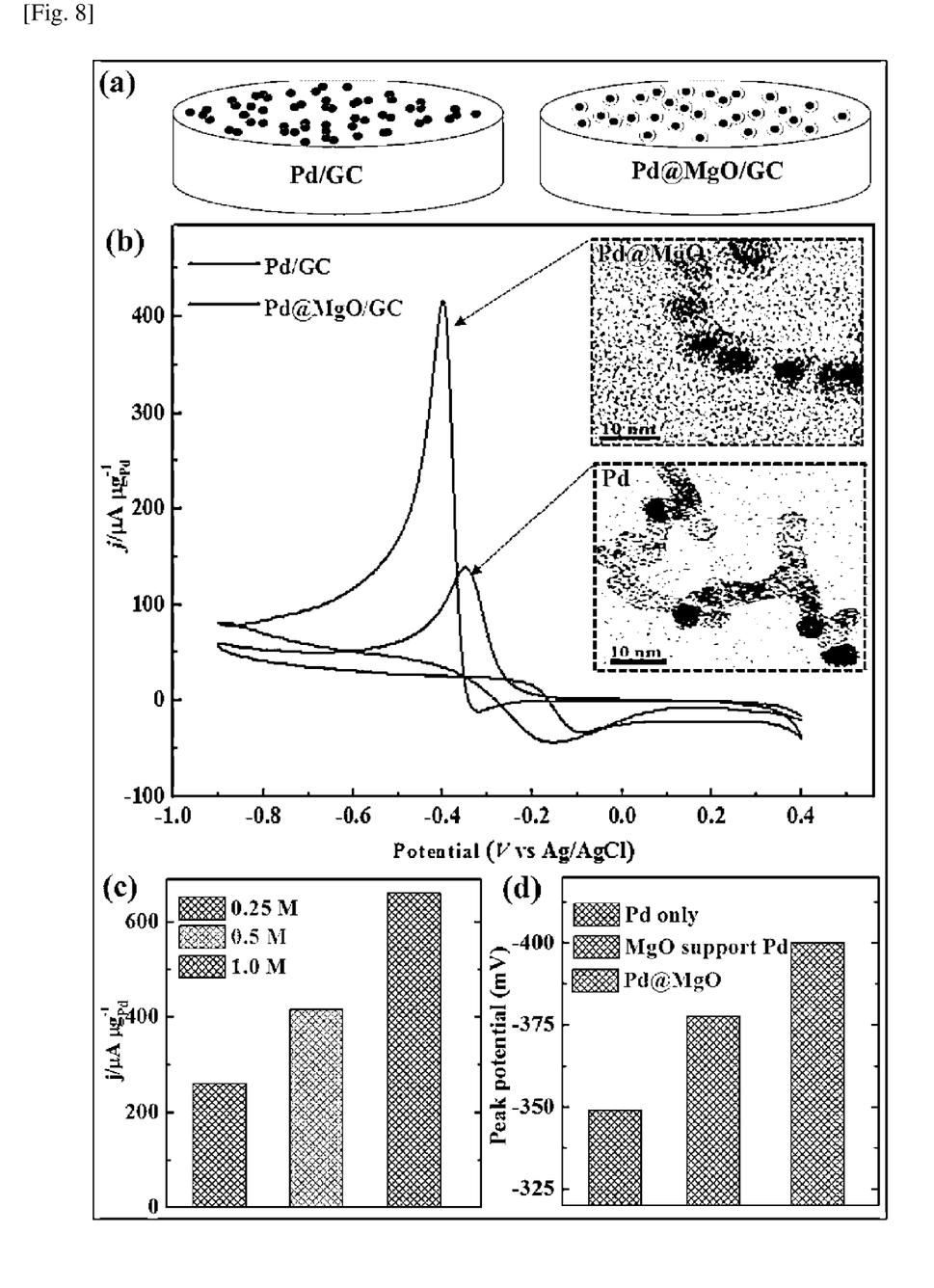
In FIG. 8, (a) shows a schematic design of Pd and Pd core-MgO shell catalytic nanostructures on GC electrode. (b) shows cyclic voltammograms of room-temperature methanol oxidation on the Pd/GC and Pd core-MgO shell/GC catalysts in 1 M KOH/0.5 M methanol at 38 mV/s. (c) shows mass activities of the Pd core-MgO shell nanocatalysts for different methanol concentrations at 0.4 V (vs. Ag/AgCl). (d) shows onset peak potentials of Pd, MgO support Pd, and the Pd core-MgO shell nanocatalysts for methanol oxidation.

For cyclic voltammetry (CV) measurements, the Pd core-MgO shell nanoparticles according to embodiments of the present invention were deposited directly onto glassy carbon (GC) electrodes (NPL No. 32), as illustrated in (a) of FIG. 8. For this investigation, the structures synthesized with sputtering ratio of 0.33 and size distribution of 9.3+−1.3 nm, as shown in (b) and (f) in FIG. 6, were analyzed. Mass current density CV curves are shown in (b) of FIG. 8. Despite the low mass, good CV signals were obtained (NPL No. 32). The general form of the curves is consistent with previous studies (NPL No. 33). Also, as shown in (c) in FIG. 8, a linear variation was observed with the methanol concentration at −0.4 V. These results indicate a reliable measurement environment. It was therefore found that these previously untested structures according to the present invention are catalytically active, demonstrating that the inert MgO shell does not passivate the internal catalytic Pd core. This in itself is a significant finding, confirming that the MgO matrix surrounding the active catalyst did not prevent reactants from arriving and products from leaving the surface to any great extent. Furthermore, it is also immediately clear that the anodic peak current density, indicative of electrocatalytic activity, is significantly increased for the core-shell structures according to the present invention, in comparison to the bare Pd nanoparticles (420 microamperes/micrograms vs 120 microamperes/micrograms, respectively). The anodic onset potential for methanol oxidation reaction (MOR) also shifted in the negative direction for core-shell particles. This is shown in (d) of FIG. 8, in which the anodic onset potentials for Pd, MgO-supported Pd, and Pd core-MgO shell structures are presented.

Figure 9:
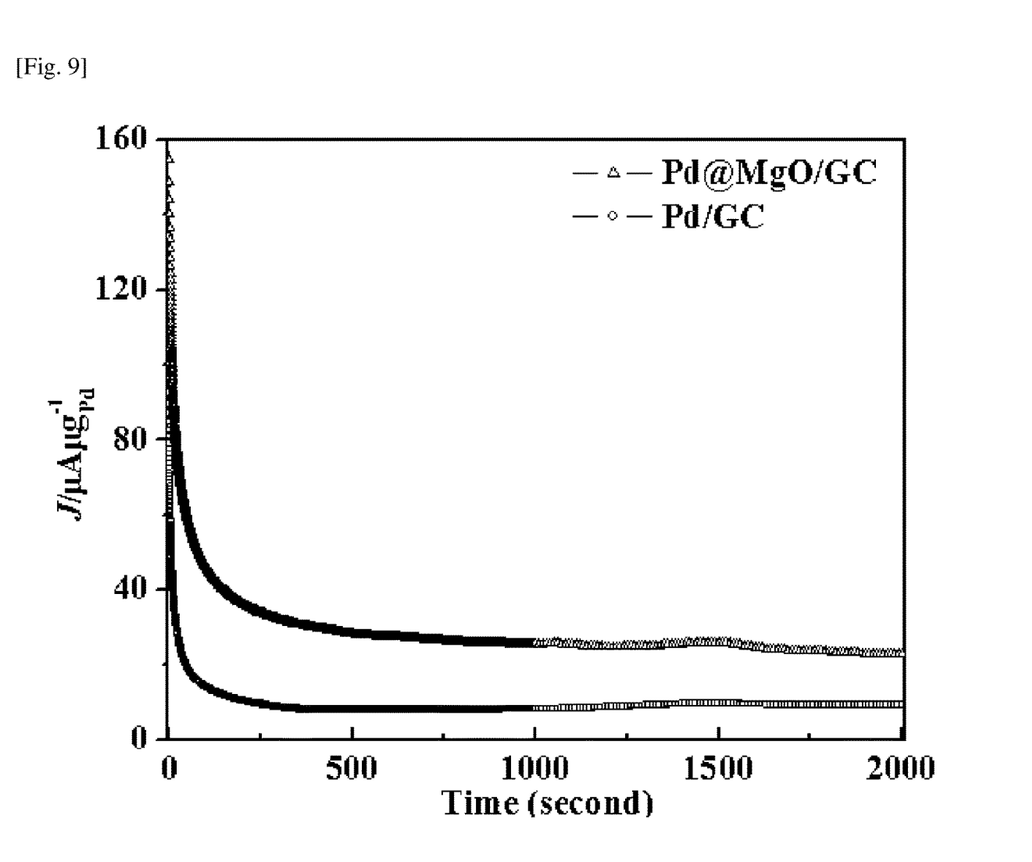
FIG. 9 shows current-time curves measured by chronoamperometry for Pd/GC and Pd core-MgO shell/GC nanocatalysts at −0.35 V (vs. AgCl) in $N_2$-saturated 1 M KOH containing 0.5 M methanol.

To evaluate the electrocatalytic stability of the as-prepared Pd core-MgO shell catalysts, long term chronoamperometric measurements were performed. FIG. 9 shows current-time curves measured by chronoamperometry for Pd/GC and Pd core-MgO shell/GC nanocatalysts at −0.35 V (vs. AgCl) in $N_2$-saturated 1 M KOH containing 0.5 M methanol. As shown in FIG. 9, once the steady-state has been reached, the Pd core-MgO shell catalysts maintain a current density that is about twice as high as that of the conventional Pd/GC catalyst. Note that while rapid dissolution of MgO in acidic solutions has been reported previously, it is quite stable in alkaline solutions (NPL No. 20), as utilized here.

Figure 10:
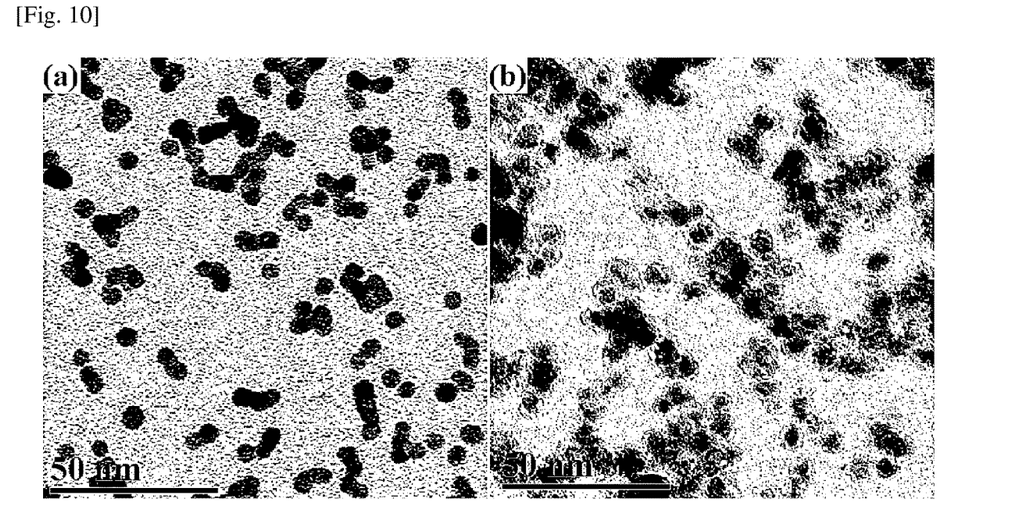
FIG. 10 shows TEM images of (a) coalesced Pd nanoparticles and (b) the Pd core-MgO shell nanoparticles, which were used for the cyclic voltammetry measurements.

FIG. 10 shows TEM images of (a) coalesced Pd nanoparticles and (b) the Pd core-MgO shell nanoparticles, which were used for the cyclic voltammetry measurements.

By considering the insets in (b) of FIG. 8 and FIG. 10, it is evident that the noble metal coalescence behavior has been significantly reduced by the presence of the MgO shell. For the case of Pd alone, the originally discrete nature of the nanoparticles (as evidenced from the in-flight mass filter) has been lost to form larger agglomerations, with associated reduced surface area. We have roughly estimated the degree of coalescence and associated loss of surface area. This has been performed on a sample basis, using TEM micrographs. The in-situ quadrupole mass filter gives the original (pre-sintering) nanoparticle size distribution, immediately after nucleation, during flight from aggregation zone to substrate.

Figure 11:
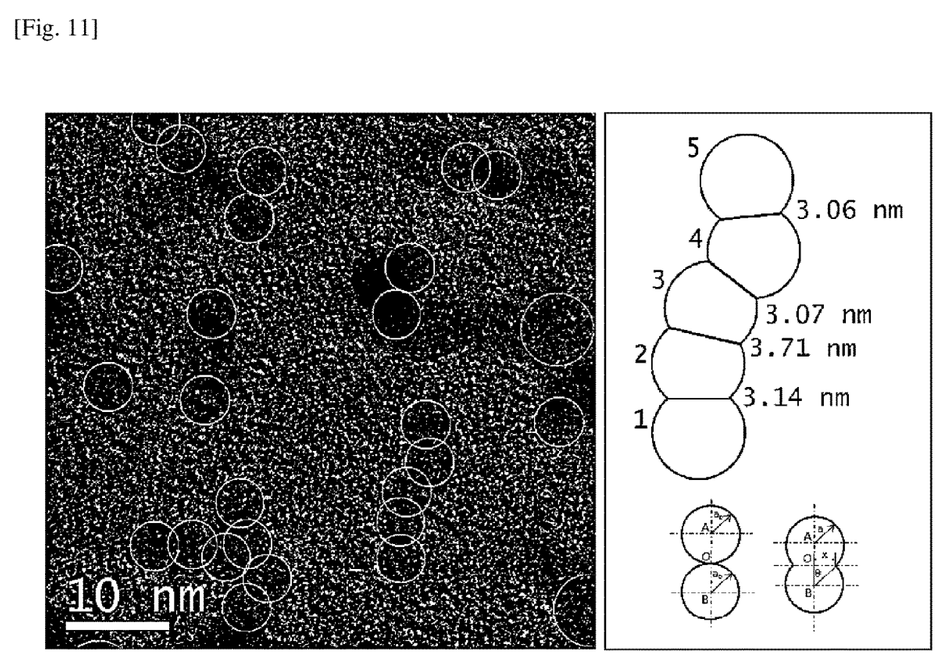
FIG. 11 shows surface area loss as a result of nanoparticle coalescence on the substrate. Particles were identified according to the original nanoparticle size (based upon the in-flight mass filter data), identified by the smallest circles. Multiples, indicating full coalescence, were also identified (middle and large sized circles). It is assumed the full coalescence only occurred in-flight, owing to the high temperatures required (NPL No. 43). Loss of surface area was then determined using the modified Frenkel method for coalesced particles (NPL No. 44), based upon the degree of interpenetration of the particles.

FIG. 11 shows the surface area loss as a result of nanoparticle coalescence on the substrate. Particles were identified according to the original nanoparticle size (based upon the in-flight mass filter data), identified by the smallest circles. Multiples, indicating full coalescence, were also identified (middle and large sized circles). It is assumed the full coalescence only occurred in-flight, owing to the high temperatures required (NPL No. 43). Loss of surface area was then determined using the modified Frenkel method for coalesced particles (NPL No. 44), based upon the degree of interpenetration of the particles. By identifying the substrate nanoparticles using the in-flight diameter and surface curvature, measurement of the degree of interpenetration, and by applying the modified Frenkel method (NPL No. 34), the loss in surface area is found to be significant, in the range of about 35% to 40%. However, the coalescence behavior of the Pd core-MgO shell structure according to the present invention is quite different. While the MgO shells in many cases come into contact, they effectively act as spacers between the Pd cores. Thus, the internal Pd cores retain their original shape and do not come into contact with each other. That the catalytic activity is not inhibited by the presence of the MgO shell is directly evidenced by the strong CV signals obtained.

The present disclosure described a newly developed controlled gas-phase synthesis method for highly active noble metal-core/porous metal oxide-shell nanocatalysts. Sputtering of Pd and Mg from two independent neighboring targets enabled heterogeneous gas-phase nanoparticle condensation with well-defined core-shell morphology. The shell did not passivate the noble metal core, and indeed the catalytic performance was improved as compared with simple Pd nanoparticles. The inhibition of Pd coalescence by the metal oxide shell was identified as one of the key contributors to the improved reactivity for methanol decomposition. These Pd core-MgO shell catalysts according to the present invention, evaluated for methanol decomposition in this study, can also be utilized for various other reactions. This simple, tunable core-shell structure and the superior performance of the nanocatalysts presented herein provides an excellent foundation to develop and optimize other noble metal-metal oxide core-shell heterogeneous nanocatalysts with tailored sizes, chemical composition, and morphologies for various catalytic reactions.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A method for manufacturing Pd core-MgO shell nanoparticles, the method comprising:
    forming a vapor including both of a super-saturated vapor of Mg and a super-saturated vapor of Pd by sputtering using an Mg target and a Pd target in a vacuumed aggregation chamber, the Mg target and the Pd target are independent neighboring targets;
    transporting the vapor including both of the super-saturated vapors of Pd and Mg to a vacuumed deposition chamber so that Pd nucleates and clusters first, followed by Mg nucleation and growth on the clustered Pd, surrounding the Pd cluster;
    thereafter, exposing resulting the Pd cluster surrounded by the grown Mg to oxygen to oxidize said surrounding Mg, thereby forming nanoparticles on a substrate in the deposition chamber, each of the nanoparticles consisting of one or more of a core made of Pd and a porous shell made of surrounding said one or more of the core, and
    changing a sputtering power ratio for the Pd target and the Mg target so as to create the nanoparticles of different sizes with different numbers of the core therein,
    wherein
    the changing of the sputtering power ratio includes:
    sputtering Pd and Mg from the Pd target and Mg target with respective sputtering powers for the Pd target and Mg target, and
    tailoring a thickness of the shell and a number of cores within each nanoparticle by adjusting respective sputtering powers of the Pd target and Mg target.

2. The method according to claim 1, wherein the core made of single crystalline Pd and the shell made of polycrystalline MgO, and
    a Pd $3d_{5/2}$ peak in an XPS survey spectrum of the nanoparticles shifts towards higher binding energy than that of Pd by a difference in electronegativities of Pd and Mg.

* * * * *